United States Patent [19]
Romano et al.

[11] Patent Number: 5,227,952
[45] Date of Patent: Jul. 13, 1993

[54] INTERLOCK DEVICE FOR CIRCUIT BREAKERS

[75] Inventors: Joseph V. Romano, Center Township, Beaver County; William Q. Aglietti, Penn Hills Twp., Allegheny County; Nagar J. Patel, Plum Boro; Robert N. Krevokuch, West Newton, all of Pa.

[73] Assignee: Westinghouse Electric Corp., Pittsburgh, Pa.

[21] Appl. No.: 666,317

[22] Filed: Mar. 8, 1991

[51] Int. Cl.$^5$ .............................................. H02B 11/12
[52] U.S. Cl. .................................... 361/339; 200/50 C
[58] Field of Search ...................... 200/50 AA, 50 C; 361/337, 339, 343, 344

[56] References Cited

U.S. PATENT DOCUMENTS

| | | | |
|---|---|---|---|
| 4,400,599 | 8/1983 | Rickman | 200/50 C |
| 4,489,362 | 12/1984 | Castonguay et al. | 361/343 |
| 4,499,344 | 2/1985 | Castonguay et al. | 361/339 |
| 4,626,638 | 12/1986 | Sampler | 200/331 |

Primary Examiner—Gregory D. Thompson
Attorney, Agent, or Firm—M. J. Moran

[57] ABSTRACT

A mechanical interlock device for preventing simultaneous operation of two 3-phase vacuum interrupter-type circuit breakers is provided. The device operates with the floor tripper and the Mechanism Operated Control ("MOC") driver of each vacuum circuit breaker. The device includes a retainer member mounted at the base of each circuit breaker. Each retainer member includes two levers. The first lever is a trip lever which engages the floor tripper of the associated circuit breaker. The second lever is driven by the MOC driver of the associated circuit breakers. The two levers are preferably mounted on a common pivot bar located at one end the retainer member. Cabling is provided between the trip lever on the first circuit breaker and the MOC driver lever on the second circuit breaker. Similarly, a cable is provided between the MOC driver lever of the first circuit breaker and the trip lever of the second circuit breaker. When either circuit breaker is in normal operation, its MOC driver is in a downward position. This forces the MOC driver lever downward which in turn rotates the trip lever in the opposite breaker upwards. The trip lever thereby acts to engage the floor tripper of the opposite circuit breaker which in turn forces the circuit breaker open and prevents it from operating while the other circuit breaker is on.

17 Claims, 5 Drawing Sheets

INTERLOCK DEVICE FOR CIRCUIT BREAKERS

BACKGROUND OF THE INVENTION

1. Field of the Invention

This invention relates generally to a mechanical interlocking device for use with multiple circuit breakers for preventing operation of more than one circuit breaker at a time.

2. Background Information and Description of the Prior Art

Circuit breakers provide protection for elect systems from electrical fault conditions such as current overloads and short circuits. Vacuum circuit breakers in particular are useful for controlling and protecting electrical systems. Vacuum circuit breakers typically include separable main contacts which are disposed within an insulating housing. Generally, one of the contacts is fixed relative to the housing and to an external electrical conductor which is interconnected with the circuit to be controlled by the circuit breaker. The other separable main contact is movable. In the case of a vacuum circuit breaker the movable contact assembly usually comprises a stem of circular cross-section having the contact at one end thereof enclosed in a vacuum chamber and a driving mechanism at the other end external to the vacuum chamber.

In many instances, several circuit breakers are used to control an electrical system. Often more than one circuit breaker is provided in order that one breaker will be operating while another is being serviced or replaced. In addition, multiple breakers provide redundancy to the system.

Circuit breakers of a high voltage type typically require a structure or a cell of sheet metal which houses and encloses the units for safety purposes and facilitates connection with the bus ducts and other auxiliary equipment. Typically, several circuit breakers are placed within a single cell housing.

As noted above, it is often desirable that only one circuit breaker be operable at any one time. In such a case, the other redundant circuit breaker must be separated from the electrical circuit so that it does not continue to operate in a situation where the primary circuit breaker has tripped. Previously, dual circuit breakers or multiple circuit breakers used as backups to a primary breaker had to be manually disengaged from the system to assure that they did not continue to operate. Although some mechanical locking devices may have been disclosed in the past for other types of circuit breakers, it has not heretofore been known to provide a mechanically operable system for the vacuum circuit breaker. It is important that a mechanical means of preventing two breakers from closing at the same time be provided in order to avoid use of electrical components which may malfunction in an electrical fault situation. In addition, it is preferable to provide an interlock system which can be utilized with both side to side, top to bottom, and diagonal installations of dual circuit breakers.

There remains a need, therefore, for a mechanical interlock device which is capable of preventing one circuit breaker in a set of breakers from operation while the other circuit breaker is operating. There remains a further need for a device which can be easily mounted in existing cell housings in a variety of configurations and which is a low cost and easy to install device. There is also a need for a device which allows one circuit breaker in a set of two circuit breakers to be removed for maintenance or service and reinstalled while the other circuit breaker is operating.

SUMMARY OF THE INVENTION

These and other needs are satisfied by the device of the present invention which comprises a mechanical circuit breaker interlocking device which operates with the floor tripper and the Motor Operated Control (MOC) driver of a vacuum circuit breaker. The device includes a retainer member which is mounted in the cell housing adjacent the base of a first circuit breaker. A second retainer member is mounted in the cell housing adjacent the base of a second circuit breaker. Each retainer member includes two levers. The first lever is a trip lever which is associated with the floor tripper of the associated circuit breaker. The second lever is driven by the MOC driver of the associated circuit breaker. The two levers are mounted on a common pivot bar which is located within the retainer member.

In normal operation of each circuit breaker a latchable operating mechanism is latched and the main contacts of the circuit breaker are seated against one another. When abnormal conditions arise the operating mechanism unlatches to separate the main contacts and interrupt current flowing through the breaker. A manual means is provided for latching the latchable operating mechanism and this is provided by the floor tripper. The floor tripper is essentially a steel bar which protrudes from the base of the circuit breaker. When an appropriate external device is used to apply force in an upward direction to the floor tripper the tripper will be forced into an upward position which in turn mechanically unlatches the latchable operating mechanism which separates the main contacts to open the breaker. In accordance with the present invention, a lever arm is used to provide the upward force to the floor tripper. This is provided by the trip lever which is mounted on the pivot bar in each retainer member associated with each circuit breaker.

Additionally, the circuit breakers contain a motor operated control ("MOC") driver which operates a bank of auxiliary switches in the circuit breaker. The MOC driver is also a bar of steel with a steel head on one end thereof which extends downwardly and depends beyond the base of the circuit breaker. When the circuit breaker is in normal operation the MOC driver is in a downwardly extended position and the steel head engages the switches which are to be activated while the breaker is operating. The second lever arm in each retaining member of the present invention is positioned to be engaged by an extension pin on the MOC driver. When the MOC driver proceeds to its downwardly depending position this forces the MOC responsive lever of the associated retaining member downwardly.

Cabling is provided between the two retainer members on the respective circuit breakers. More specifically, a flexible cable is connected at one end of the MOC responsive lever associated with the first circuit breaker and at the other end the cable is connected to the trip lever associated with the second circuit breaker. When the first circuit breaker is in normal operation, (meaning it is closed) the MOC driver is in a downward position which in turn forces the MOC responsive lever downward. This downward position of the MOC responsive lever provides a tension force on the cable which in turn acts to pull the trip lever of the opposite breaker to an upward position. The trip lever engages the floor tripper of the associated circuit breaker and drives the floor tripper to its upward position. As stated above, when the floor tripper is in its upward open position, the circuit breaker cannot be closed. If that breaker was opened when the floor tripper is raised, then the contacts of the breaker could not then be closed. If, on the other hand, the breaker was closed, then the contacts would be forced opened. A similar cabling system is provided between the MOC responsive lever of the second circuit breaker and the floor tripper of the first circuit breaker. The result is that only one circuit breaker can be operative at any one time.

This simple device can be retrofitted to existing cell housings in any configuration. For example, the device can be mounted on two side-to-side circuit breakers, on two circuit breakers which are in a vertical orientation or between breakers which are diagonally opposed to one another.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
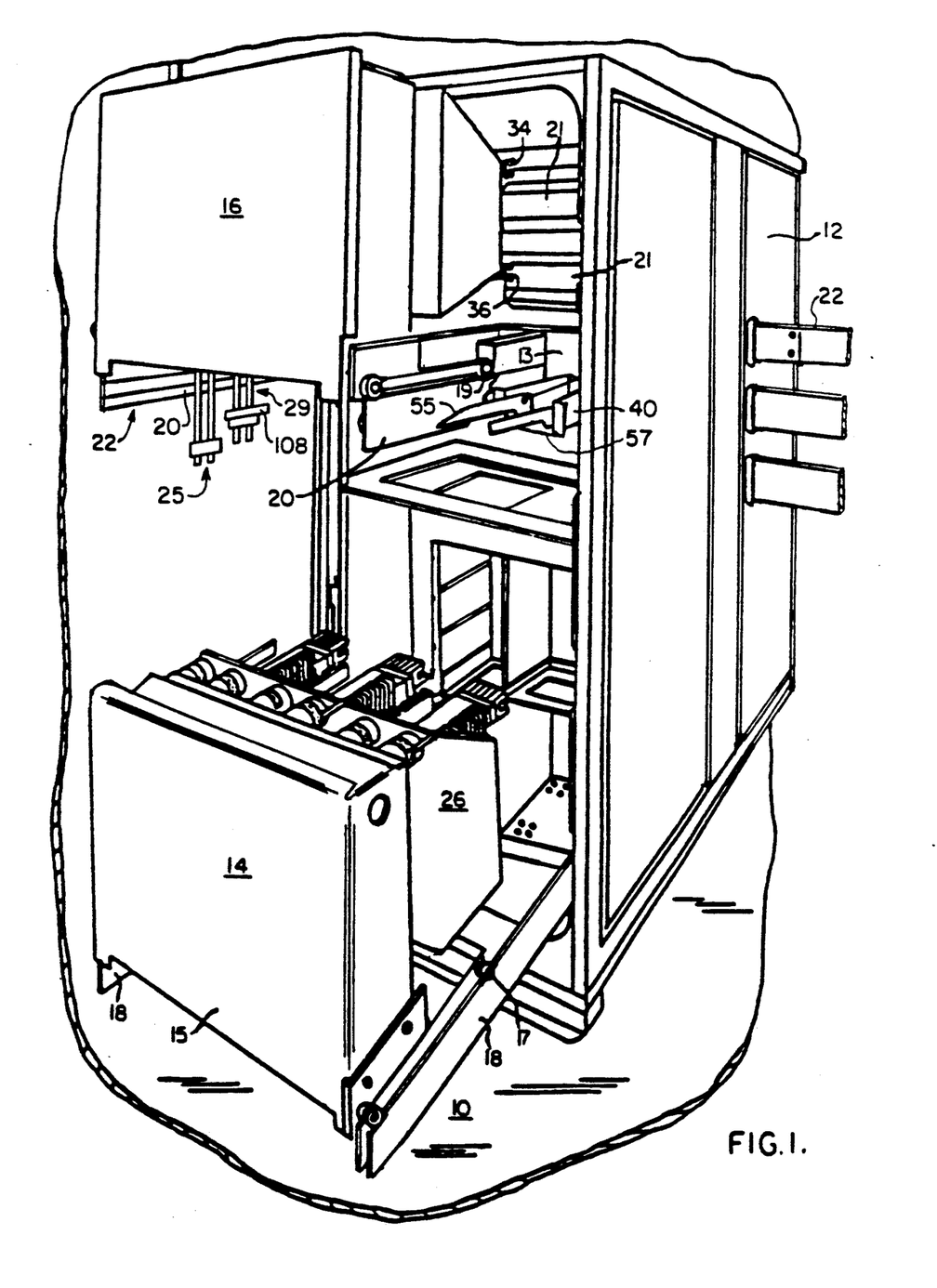
FIG. 1 is an isometric illustration of two circuit breakers in vertical configuration mounted in a cell housing containing the device of the present invention.
Figure 2:
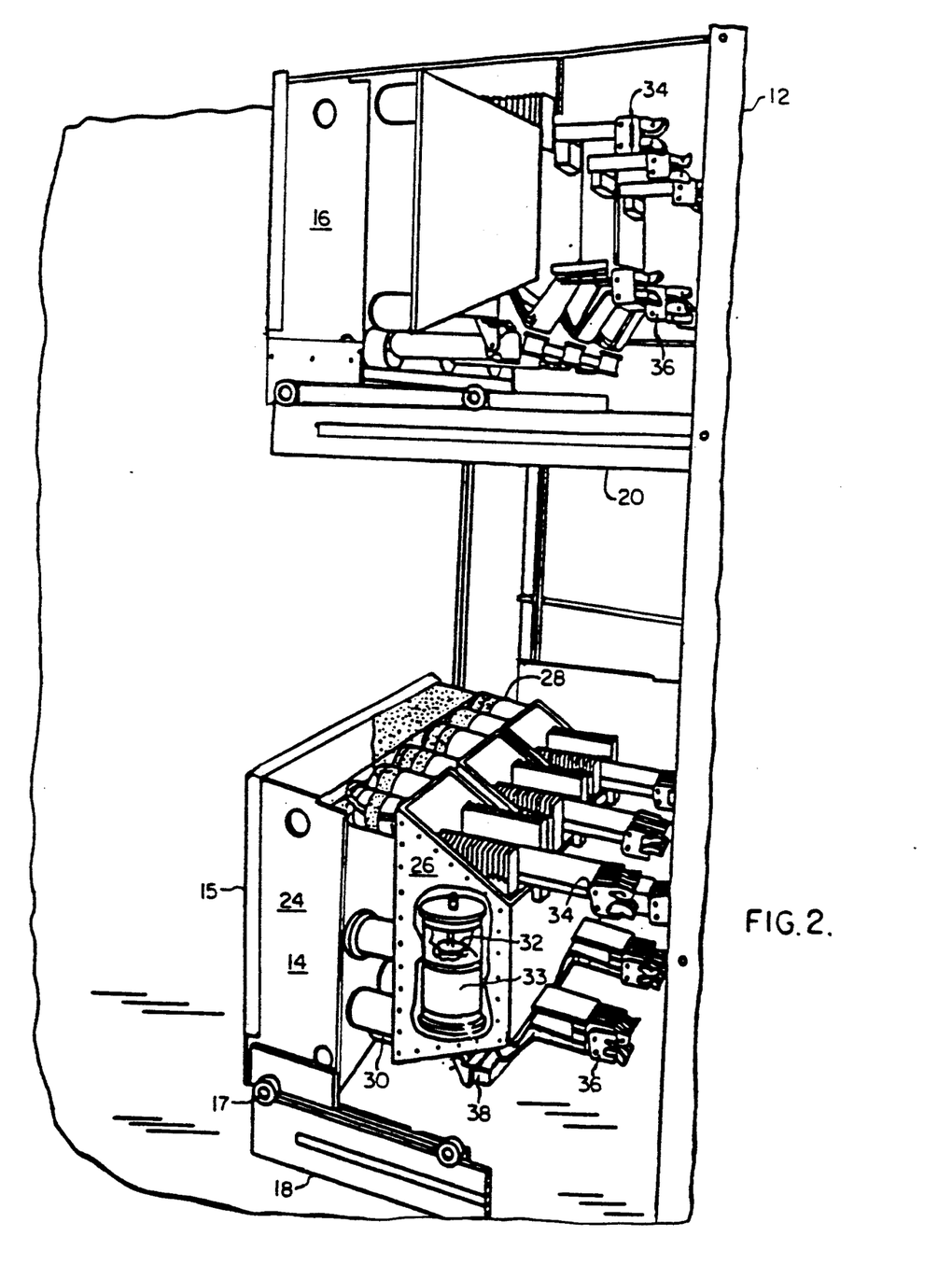
FIG. 2 is a side view of the circuit breakers of FIG. 1.

Referring to FIGS. 1 and 2, there is illustrated a cell housing 12 which may have two tandemly and vertically disposed drawout 3-phase vacuum interrupter-type circuit breakers 14 and 16. The front panel 15 of circuit breaker 14, for example, may have controls thereupon (not shown) for manually operating the circuit breaker. The lower circuit breaker 14 is movably disposed by way of wheels 17 on rails 18 for moving the circuit breaker into and out of a disposition of electrical contact with live terminals (not shown) disposed in the rear of cell housing 12. Likewise, upper circuit breaker 16 is movably disposed by way of wheels 19 on rails 20 for moving the upper circuit breaker 16 into and out of disposition of electrical contact with associated terminals (not shown) in the rear of cell 12.

Movable shutters such as shown at 21 may be interposed between the terminal 34 and 36, for example, of either of the three-phase drawout circuit breakers 14 and 16 for shielding the cabinet high-voltage terminals from inadvertent contact therewith when the three-phase circuit breakers 14 and 16 have been withdrawn to the position shown in FIG. 1. As best shown in FIG. 2, the three-phase circuit breaker 14, for example, may include a front portion 24 in which controls and portions of an operating mechanism are disposed, and a rear portion 26. The front portion 24 is generally a low-voltage portion and the rear portion 26 is generally a high-voltage portion. The high-voltage, rear portion 26 is supported by and electrically insulated from the low voltage, front portion 24 by way of upper and lower insulators 28 and 30, respectively.

This apparatus is more particularly described in U.S. Pat. No. 4,384,179 the assignee of which is the assignee of the present invention. U.S. Pat. No. 4,384,179 is hereby incorporated herein in its entirety.

A suitable construction for cell housing 12 has been disclosed in U.S. Pat. No. 4,650,085 which relates to enclosure structures for circuit breaker assemblies and similar apparatus. The assignee of U.S. Pat. No. 4,650,085 is the assignee of the present invention and that patent is also hereby incorporated herein by reference.

Also shown in FIG. 1, circuit breaker 16 has floor tripper 25 extending downwardly from the base, generally designated by reference character 22. Additionally, circuit breaker 16 has MOC driver 29 also downwardly depending from base 22 of circuit breaker 16. Circuit breaker 14 is provided similarly with a floor tripper and an MOC driver which are not visible in FIG. 1.

In the exemplary circuit breaker 16, the floor tripper 25 is an assembly composed of two bars of metal, preferably steel, held together by a cylindrical seperator. Floor tripper 25 is associated with a latchable operating mechanism of breaker 16. The latchable operating mechanism (not shown) is described in further detail in U.S. Pat. No. 4,384,179 mentioned above. Floor tripper 25 when forced to an upward position acts to unlatch the latchable operating mechanism. This in turn separates the main contacts 32 contained within vacuum housing 33 of breaker 16 and interrupts current flowing through breaker 16 (FIG. 2). Floor tripper 25 as noted above is movable between a downward position and an upward position. Conventionally, a manually operated crowbar is used to engage floor tripper 25 and to force it into its upward position if it is desired to force breaker 16 open. The tripper 25 is spring biased to the downward position so that it will not move upwardly unless it is acted upon by an externally-applied force. When an externally applied force drives floor tripper 25 upwardly, the latchable operating mechanism is unlatched and the circuit breaker 16 is opened. Current flow is thereby interrupted.

As noted above, circuit breaker 16 is also provided with MOC driver 29. The MOC driver 29 operates a bank of auxiliary switches (not visible) in the circuit breaker 16. The switches control warning lights, remote control devices and other sub-assemblies in the breaker. When the circuit breaker 16 is operating normally and the contacts are closed, MOC driver 29 is in a downward position. The MOC driver 29 moves to its downward position to engage and activate the switches which are normally activated when the breaker 16 is closed. The MOC driver 29 has a head (not visible) at one end thereof which contacts the switches. In accordance with the present invention, the MOC driver 29 is modified to include an additional extension pin, or spacer, 108 protruding out from one side of the MOC driver 29. This is discussed in further detail hereinafter.

The present invention employs a U-shaped retainer member 40 (FIG. 1) which is bolted to the cell housing 12 at the back wall which is generally designated by 13. U-shaped retainer member 40 supports a first lever 57 which engages the MOC driver 29 of the circuit breaker 16 and a second lever 55 which engages the floor tripper 25. A similar U-shaped retainer member (not shown in FIG. 1) is mounted to the lower portion of back wall 13 of cell housing 12 to engage the corresponding floor tripper and MOC driver of circuit breaker 14 but these components are not visible in FIG. 1.

Figure 3:
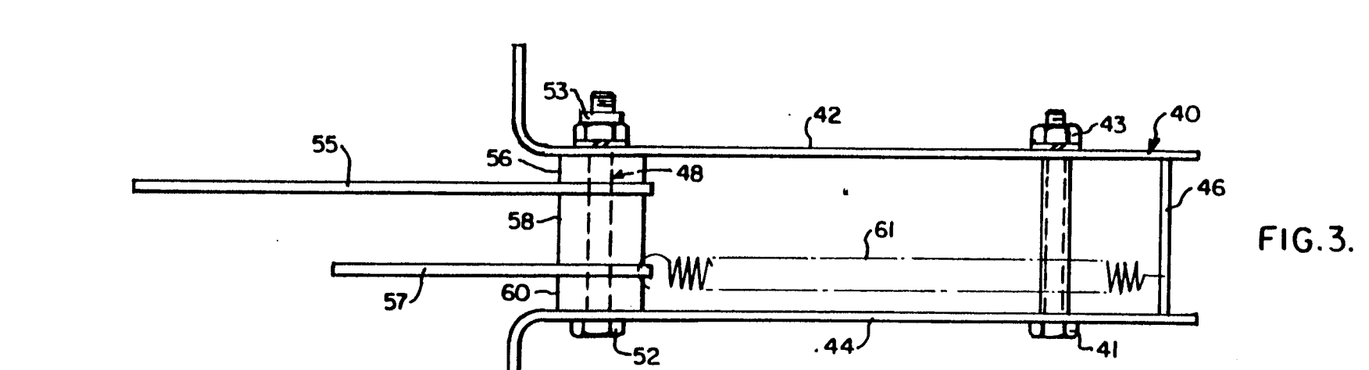
FIG. 3 is a top plan schematic illustration of the retainer member and lever arms of the interlock device of the present invention.

Referring to FIG. 3, a preferred form of the device of the present invention will be discussed in detail. The retainer member 40 is generally U-shaped and it has side member 42 and a parallel second side member 44 which are joined by center bar 46. U-shaped retainer member 40 may be constructed of a unitary formed piece of metal or it may be three separate pieces joined together as shown in FIG. 3. The retainer member 40 may be held together and secured by bolt member 41 which is retained in place by nut 43. A pivot bar 48 is provided generally adjacent one end of retainer member 40. Pivot bar 48 may be composed of bolt 52 and retaining nut 53. Pivot bar 48 supports trip lever 55 and MOC responsive lever 57. Trip lever 55 and MOC responsive lever 57 are pivotally mounted on pivot bar 48 of retainer member 40. Levers 55 and 57 are spaced apart and generally parallel to one another. They are maintained in this position by cylindrical spacers. Spacer 56 separates lever 55 from side member 42. Spacer 58 separates lever 55 from lever 57. Spacer 60 separates lever 57 from side member 44. Preferably, spacers 56, 58 and 60 are steel cylinders through which pivot bar 48 is passed and nut 53 is secured at one end of bar 48 to retain the entire assembly in place.

Figure 4:
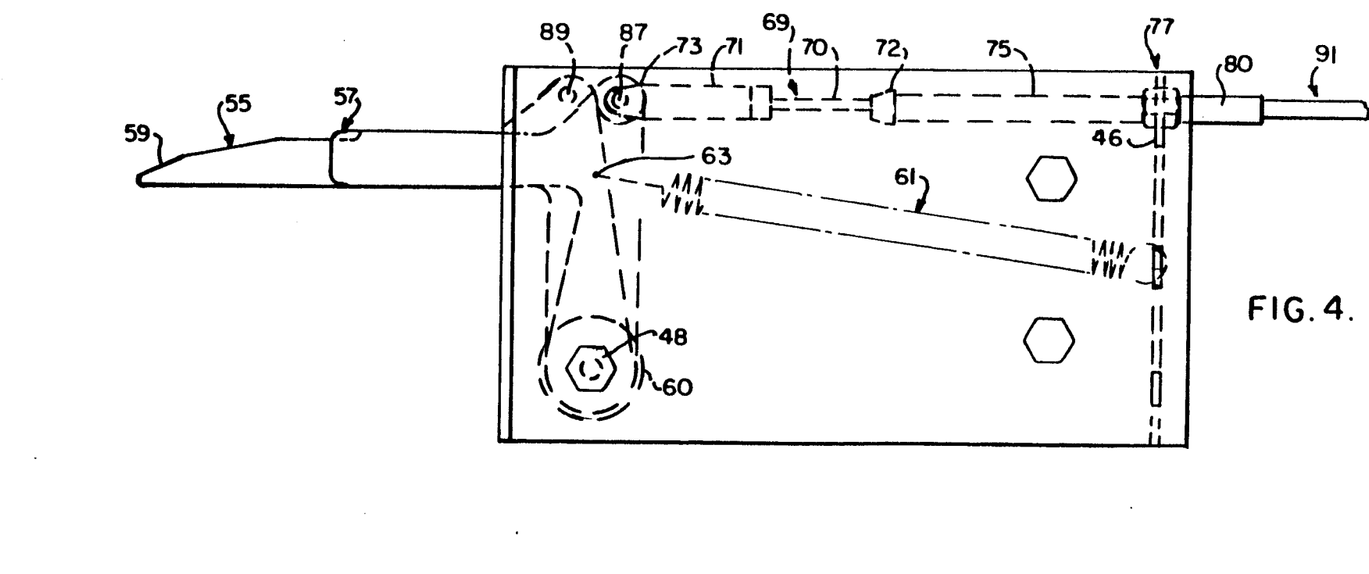
FIG. 4 is a schematic side illustration of the retainer member of FIG. 3.

A side view of the levers 55 and 57 is shown in FIG. 4. Trip lever 55 is elongated and has a camming surface 59 which is adapted to engage an extension pin, as described in further detail hereinafter, on the floor tripper 25 of an associated circuit breaker 16 (FIG. 1). MOC responsive lever 57 is shorter than lever 55 and it is adapted to be engaged by the MOC driver 29 of the associated circuit breaker 16 (FIG. 1). More specifically, MOC responsive lever 57 is engaged by the extension pin 108 of the MOC driver 29.

As will be described in further detail below, MOC responsive lever 57 is spring biased by spring 61. Preferably spring 61 is a tension spring which is attached at one end at biasing point 63 of MOC responsive lever 57 and at the other end to connecting bar 46. As is evident from FIG. 4, spring 61 is biasing MOC lever 57 in an upward position. In this way, MOC responsive lever 57 will only move to a downward position if it is forced to do so by the downward motion of the associated MOC driver of the relevant circuit breaker. Trip lever 55, on the other hand, is free to rotate about pivot bar 48. However, the floor tripper such as floor tripper 25 of circuit breaker 16 (FIG. 1) is spring biased in the downward position. This is to ensure that the floor tripper 25 will only move to its upward position which serves to unlatch the latchable operating mechanism if an external force is applied to the floor tripper 25. Trip lever 55 engages the associated floor tripper such as floor tripper 25 and provides this upward force when it is driven upward by an associated flexible cable 91. Cable 91 is attached at tension point 87 of trip lever 55. A similar flexible cable, not shown in FIG. 4, is attached at tension point 89 of MOC responsive lever 57.

Cable 91 is attached to trip lever 55 by means of a clevis assembly generally designated by reference character 69. Clevis assembly 69 has exposed cable portion 70 which is threaded into a corresponding threaded portion of U-shaped clevis 71. Clevis 71 is held in engagement with lever 55 by cotter pin 73. A steel sleeve 75 is passed over cable 70 and is sealed by umbrella seal 72. The assembly is passed through an opening in center bar 46 of U-shaped retainer member 40. The assembly is secured by double nut 77. The nut 77 is threaded on to a correspondingly threaded portion of sleeve 75. This allows adjustment of the cable connection to obtain the appropriate force on lever 55 to raise it into contact with the floor tripper. Sealing sleeve 80 also passes over jacketed cable 91 and has the second half of double nut 77 threaded on to it at one end. The opposite end of sleeve 80 is crimped onto the jacket of cable 91. In this way, the cable 91 is firmly secured while allowing motion to be transferred from cable 91 to lever 55.

Figure 5:
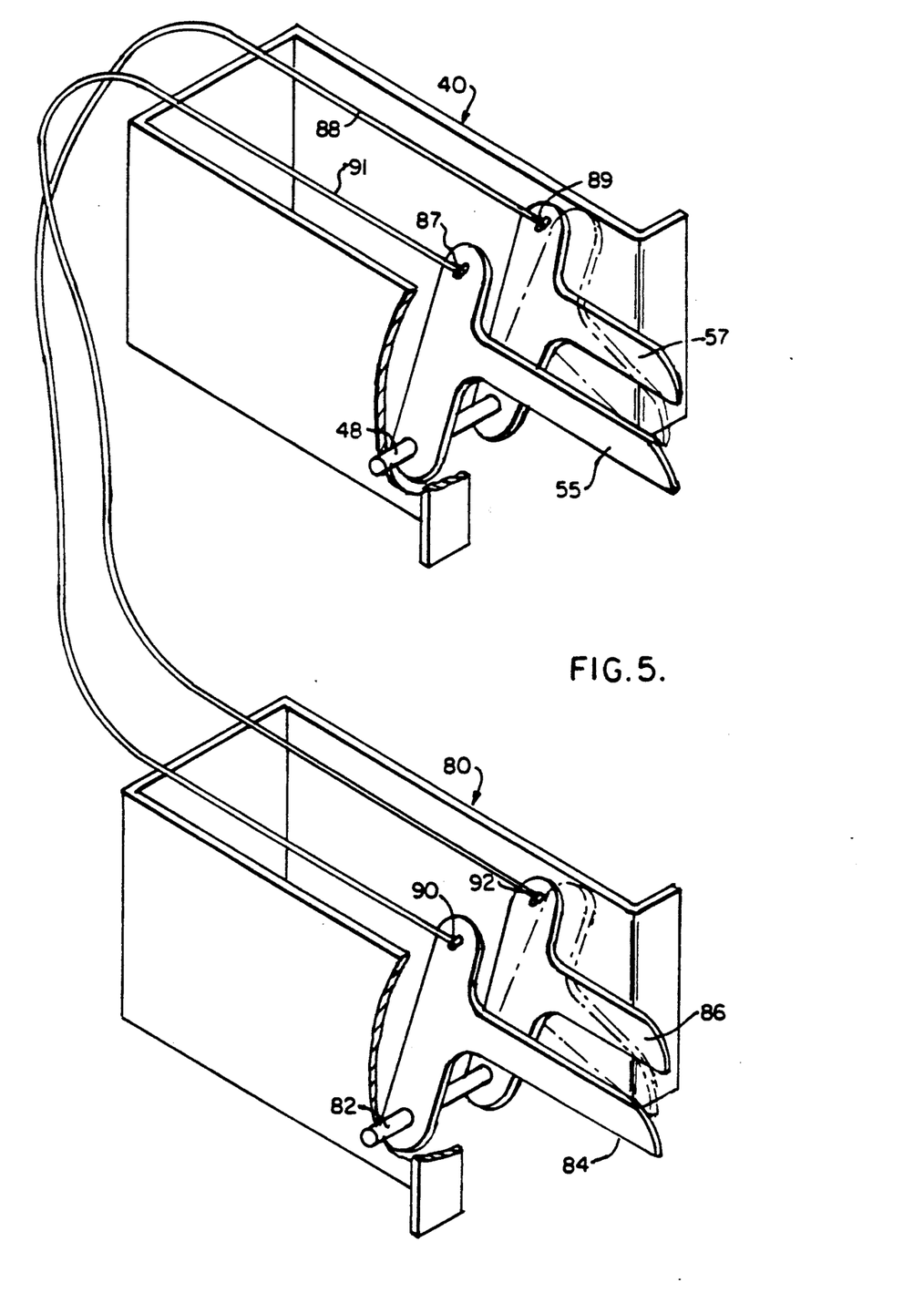
FIG. 5 is a schematic isometric illustration of the interlock device of the present invention showing the cable connections between the lever arms of the interlock device in a vertical, configuration.

Referring to FIG. 5, a first retainer member 40 is shown in tandem and vertical association with second retainer member 80. This assembly of retainer members 40 and 80 is used with two vertically stacked circuit breakers such as breakers 14 and 16 of FIG. 1. The retainer members are each mounted in cantilever fashion to the back wall 13 of cell housing 12 and each retainer member extends underneath the base of the respective circuit breaker such that the levers, discussed hereinafter, of each retainer member can contact the respective floor tripper and MOC driver of each breaker.

First retainer 40 has pivot bar 48 upon which trip lever 55 and MOC responsive lever 57 are pivotally mounted. As noted above, spacers are used to maintain the levers 55 and 57 in the desired position, however, for purposes of clarity, they are not shown in FIG. 5. Similarly, retainer member 80 has pivot bar 82 upon which trip lever 84 and MOC responsive lever 86 are pivotally mounted. Suitable spacers are used to maintain the levers 84 and 86 in position, but they are not shown in FIG. 5. A cable 88 is connected at point 89 of MOC responsive lever 57 on the first retainer member 40. The cable 88 is routed appropriately through the cell housing 12 (not shown in FIG. 5) and is connected to point 90 on trip lever 84 of second retainer member 80. Similarly, second cable 91 is connected at one end at point 87 to trip lever 55 of first retainer member 40. Cable 91 is routed through cell housing 12 and is connected at its other end to point 92 on MOC responsive lever 86 of second retainer member 80. The cables are preferably connected by clevis and pin assemblies such as that described with reference to FIG. 4, however, other connection assemblies may be used while remaining within the scope of the present invention.

Preferably, cables 88 and 91 are push-pull type mechanical flexible cables. These cables can be bent and routed through cell housing 12 as desired with very little motion loss through the cables.

When the first circuit breaker 16 (FIG. 1) is in normal operation, the associated retainer member 40 would have MOC responsive lever 57 driven downwardly by the associated MOC driver as shown in the position shown in phantom in FIG. 5. This applies a tension force on cable 88. As noted hereinbefore, very little loss occurs along cable 88 and the motion is almost entirely transferred through the cable 88 to trip lever 84. This force creates a pulling action on cable 88 at point 90 which causes trip lever 84 to move into an upward position. This occurs with sufficient force so that trip lever 84 engages the associated floor tripper on the second circuit breaker such as circuit breaker 14 in FIG. 1. The upward force on the floor tripper of the second circuit breaker causes the latchable operating mechanism to unlatch, thereby interrupting and preventing further operation of that circuit breaker.

When it is desired to have the second circuit breaker 14 in normal operation, its MOC driver would be in a downward position which would cause MOC responsive lever 86 of retainer member 80 to proceed to the downward position shown in phantom in FIG. 5. This pulls cable 91 which in turn applies a force on trip lever 55 on the opposite retainer member 40. This causes trip lever 55 to engage the associated floor tripper of the first circuit breaker 16 and it forces the floor tripper into its upward position which prevents operation of that circuit breaker.

Figure 6:
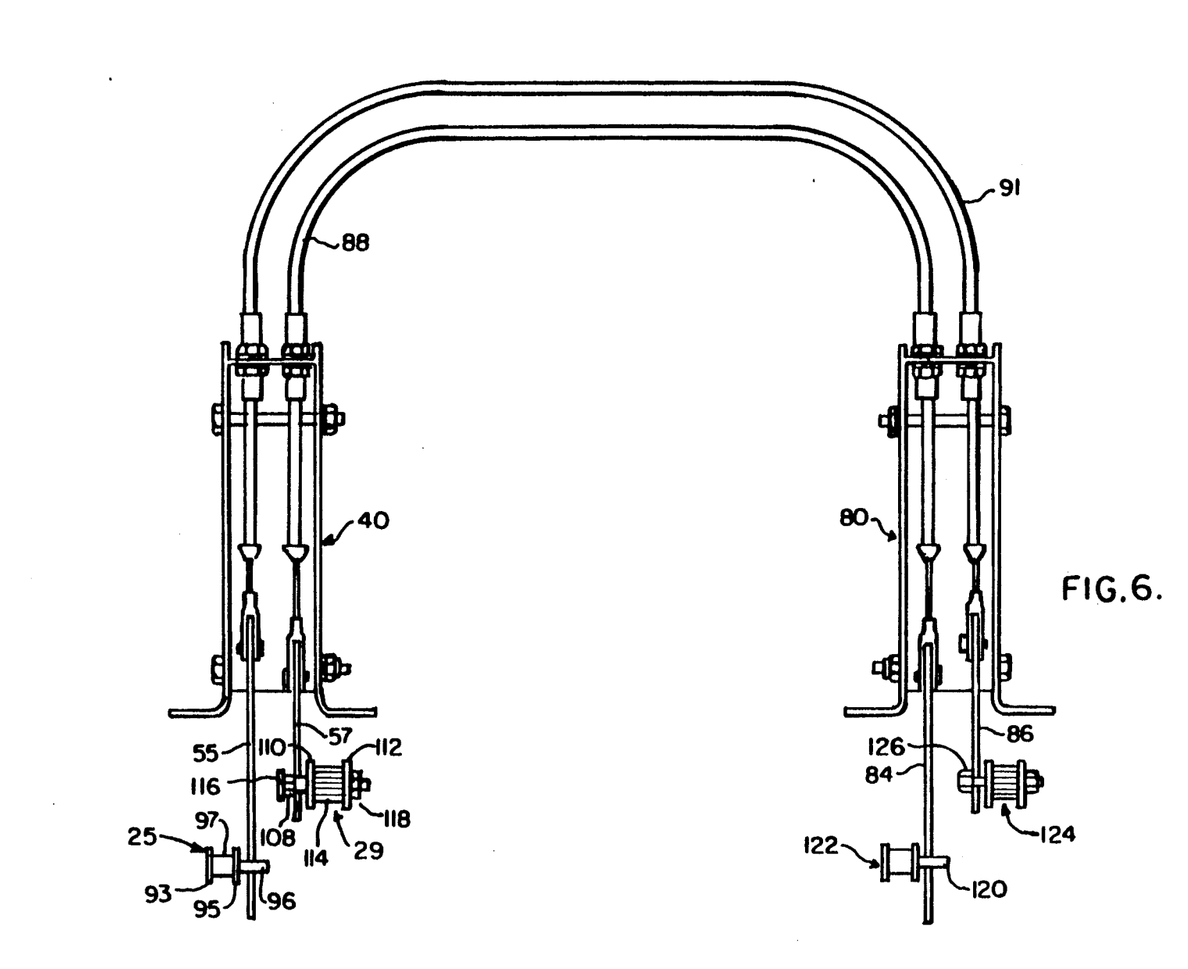
FIG. 6 is a bottom plan schematic view of the interlock device of the present invention used with two circuit breakers in a side-to-side configuration also showing the MOC driver bar and the floor tripper engaged by the levers of the device.

Referring to FIG. 6, retainer members 40 and 80 are shown in a side-to-side configuration. Retainer member 40 has trip lever 55 and MOC responsive lever 57. Retainer member 80 has trip lever 84 and MOC responsive lever 86. Flexible cables 88 and 91 connect the opposing levers between the respective retainer members in the manner described above.

Trip lever 55 of retainer member 40 engages the floor tripper 25 of the associated circuit breaker. In accordance with one embodiment of the invention rather than the trip lever 55 engaging the floor tripper 25 directly, the floor tripper 25 can be modified to include extension pin 96. The extension pin 96 may simply be a cylindrical core of metal, preferably steel, which is added to the floor tripper 25. Specifically, floor tripper 25 is comprised of two parallel bars of metal 93 and 95 only the ends of which are visible in FIG. 6. Bars 93 and 95 are separated by hollow, cylindrical spacer 97. Extension pin 96 is passed through the center of spacer 97 and the entire assembly is held together by a retaining clip (not visible). Preferably, extension pin 96 is about 0.75 inches in length.

Additionally, MOC driver 29 is modified to include a spacer 108 which is engaged by MOC responsive lever 57. MOC driver 29 is also comprised of parallel bars of metal 110, 112 separated by a spacer 114. Spacer 108 is composed of a hollow piece of metal. A bolt 116 with a rounded head is passed through spacer 108, bar 110, then through spacer 114 and through metal bar 112. The entire assembly is held in place by nut 118. Spacer 108 is adapted to be engaged by MOC responsive lever 57. Preferably, spacer 108 is composed of steel and is about 0.75 inches in length.

Retainer member 80 has trip lever 84 which engages extension pin 120 of floor tripper 122. MOC driver 124 has spacer 126 which engages MOC responsive lever 86.

In operation, if the first circuit breaker with which retainer 40 is associated is operating, the MOC driver 29 is in a downward position. This in turn forces the associated MOC responsive lever 57 into its downward position. This provides the tension force on cable 88 which pulls the trip lever 84 of the opposite retainer member 80 into its upward position. This applies the external force necessary on the associated floor tripper to cause the floor tripper to trip the latchable operating mechanism of that circuit breaker and cause it not to operate. Alternatively, if it is desired that the opposite breaker should operate, it will be turned on and its MOC driver 124 moves to the downward position. This causes a downward motion by MOC responsive lever 86 which in turn provides a tension force on cable 91. Cable 91 acts to pull trip lever 55 upward to activate floor tripper 25 to interrupt operation of the associated circuit breaker.

If, for example, circuit breaker 16 enters its trip position in response to an abnormal current condition, it is noted that this does not cause the opposite circuit breaker to come into operation. As discussed hereinbefore, when the circuit breaker 16 is operating, its MOC driver 29 (FIG. 1) is in the downward position. Then, when the circuit breaker 16 trips, its MOC driver moves to the upward position. MOC responsive lever 57 (FIG. 5) would move upward due to the spring action on it. This in turn would create a force on cable 88 which would urge trip lever 84 of the opposite circuit breaker 14 downwards. However, the floor tripper of that circuit breaker is already in a trip free position meaning that it could not be closed. In these circumstances, both circuit breakers are opened and a positive action would be required to place one or the other back into the closed position. For example, one or the other could be manually reset to its closed position.

It is noted that while a preferred form of the invention including levers mounted on a common pivot bar is disclosed, other forms of components responsive to the downward motion of the MOC driver of the circuit breaker could be utilized while remaining within the scope of the present invention.

It should be appreciated that the device of the present invention provides a simple, easy to install interlocking device which prevents two circuit breakers from operating at the same time. This provides a safety feature which avoids the need to manually shut off or disconnect a particular circuit breaker while the other one is in use. As the device is a mechanically operating device, an electrical fault in the system would not affect the operation of this safety feature. The device can be easily retrofitted with existing cell housings. In addition, the device allows for one circuit breaker to continue to operate while the other circuit breaker in the system is removed for repair, replacement and the like and later reinstallation of the removed circuit breaker may be achieved while the other circuit breaker in the system continues to operate.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereto.

What is claimed is:

1. A circuit breaker assembly for protecting an electrical system, comprising:

a cell housing;

a first circuit breaker mountable in said cell housing having a pair of separable electrical contacts operable between a closed position and an opened position, said first circuit breaker further having a MOC driver for indicating the positioning of said pair of separable electrical contacts of said first circuit breaker and a floor tripper for opening said pair of separable electrical contacts of said first circuit breaker;

a second circuit breaker mountable in said cell housing having a pair of separable electrical contacts operable between a closed position and an opened position, said second circuit breaker further having a MOC driver for indicating the positioning of said pair of separable electrical contacts of said second circuit breaker and a floor tripper for opening said pair of separable electrical contacts of said second circuit breaker;

first interlock means mountable in said cell housing substantially adjacent said first circuit breaker for cooperating with said MOC driver and said floor tripper of said first circuit breaker;

second interlock means mountable in said cell housing substantially adjacent said second circuit breaker for cooperating with said MOC driver and said floor tripper of said second circuit breaker;

flexible interconnecting means for interconnecting said first interlock means and said second interlock means.

2. The circuit breaker assembly of claim 1, wherein said flexible interconnecting means comprises a first cable and a second cable.

3. The circuit breaker assembly of claim 2, wherein said first cable comprises a push-pull type mechanical flexible cable and wherein said second cable comprises a push-pull type mechanical flexible cable.

4. The circuit breaker assembly of claim 3 wherein said first interlock means comprises a MOC responsive lever engagable with said MOC driver of said first circuit breaker and a trip lever engagable with said floor tripper of said first circuit breaker, and wherein said second interlock means comprises a MOC responsive lever engagable with said MOC driver of said second circuit breaker and a trip lever engagable with said floor tripper of said second circuit breaker.

5. The circuit breaker assembly of claim 2, wherein said first interlock means comprises a MOC responsive lever engagable with said MOC driver of said first circuit breaker and a trip lever engagable with said floor tripper of said first circuit breaker, and wherein said second interlock means comprises a MOC responsive lever engagable with said MOC driver of said second circuit breaker and a trip lever engagable with said floor tripper of said second circuit breaker.

6. The circuit breaker assembly of claim 5, wherein said first cable is interconnected between said MOC responsive lever of said first interlock means and said trip lever of said second interlock means, and wherein said second cable is interconnected between said MOC responsive lever of said second interlock means and said trip lever of said first interlock means.

7. The circuit breaker assembly of claim 6, wherein said first interlock means further comprises a retainer member having a pivot bar on which said MOC responsive lever and said trip lever of said first interlock means are mounted, and wherein said second interlock means further comprises a retainer member having a pivot bar on which said MOC responsive lever and said trip lever of said second interlock means are mounted.

8. The circuit breaker assembly of claim 7, wherein said pivot bar of said first interlock means has a cylindrical spacer disposed thereon, said cylindrical spacer of said pivot bar of said first interlock means positioned adjacent said MOC responsive lever and said trip lever of said first interlock means for maintaining said MOC responsive lever and said trip lever of said first interlock means in substantially parallel disposition; and wherein said pivot bar of said second interlock means has a cylindrical spacer disposed thereon, said cylindrical spacer of said pivot bar of said second interlock means positioned adjacent said MOC responsive lever and said trip lever of said second interlock means for maintaining said MOC responsive lever and said trip lever of said second interlock means in substantially parallel disposition.

9. The circuit breaker assembly of claim 7, wherein said first interlock means further comprises a spring biasing means connected to said MOC responsive lever of said first interlock means and said retainer member of said first interlock means for biasing said MOC responsive lever of said first interlock means in a substantially upward position; and wherein said second interlock means further comprises a spring biasing means connected to said MOC responsive lever of said second interlock means and said retainer member of said second interlock means for biasing said MOC responsive lever of said second interlock means in a substantially upward position.

10. The circuit breaker assembly of claim 4, wherein said MOC driver of said first circuit breaker has disposed thereon an extension pin, and wherein said MOC driver of said second circuit breaker has disposed thereon an extension pin.

11. The circuit breaker assemble of claim 4, wherein said floor tripper of said first circuit breaker has disposed thereon an extension pin, and wherein said floor tripper of said second circuit breaker has disposed thereon an extension pin.

12. A mechanically operated interlock for use with a set of circuit breakers defined by a first circuit breaker and a second circuit breaker for preventing the simultaneous operation of the circuit breakers, said interlock comprising:

first interlock means for preventing the operation of the first circuit breaker;

second interlock means for preventing the operation of the second circuit breaker; and first and second cables for interconnecting said first interlock means and said second interlock means, wherein said first interlock means comprises a first lever and a second lever and wherein said second interlock means comprises a first lever and a second lever.

13. The mechanically operated interlock of claim 12, wherein said first cable interconnects said first lever of said first interlock means and said second lever of said second interlock means, and wherein said second cable interconnects between said first lever of said second interlock means and said second lever of said first interlock means.

14. The mechanically operated interlock of claim 13, wherein said first interlock means further comprises a retainer member having a pivot bar on which said first lever and said second lever of said first interlock means are mounted, and wherein said second interlock means further comprises a retainer member having a pivot bar on which said first lever and said second lever of said second interlock means are mounted.

15. The mechanically operated interlock of claim 14, wherein said pivot bar of said first interlock means has a cylindrical spacer disposed thereon, said cylindrical spacer of said pivot bar of said first interlock means positioned adjacent said first lever and said second lever of said first interlock means for maintaining said first lever and said second lever of said first interlock means in substantially parallel disposition; and wherein said pivot bar of said second interlock means has a cylindrical spacer disposed thereon, said cylindrical spacer of said pivot bar of said second interlock means positioned adjacent said first lever and said second lever of said second interlock means for maintaining said first lever and said second lever of said second interlock means in substantially parallel disposition.

16. The mechanically operated interlock of claim 14, wherein said first interlock means further comprises a spring biasing means connected to said first lever of said first interlock means and said retainer member of said first interlock means for biasing said first lever of said first interlock means in a substantially upward position; and wherein said second interlock means further comprises a spring biasing means connected to said first lever of said second interlock means and said retainer member of said second interlock means for biasing said first lever of said second interlock means in a substantially upward position.

17. A mechanically operated interlock for use with a set of circuit breakers defined by a first circuit breaker and a second circuit breaker for preventing the simultaneous operation of the circuit breakers, said interlock comprising:

first interlock means for preventing the operation of the first circuit breaker;

second interlock means for preventing the operation of the second circuit breaker; and first and second cables for interconnecting said first interlock means and said second interlock means, wherein said first cable comprises a push-pull type mechanical flexible cable and wherein said second cable comprises a push-pull type mechanical flexible cable, wherein said first interlock means comprises a first lever and a second lever and wherein said second interlock means comprises a first lever and a second lever.

* * * * *